United States Patent [19]
Lin et al.

[11] Patent Number: 5,754,945
[45] Date of Patent: May 19, 1998

[54] FUZZY LOGIC CONTROL OF CELLULAR HANDOFF

[75] Inventors: Jing-Yue Lin, Kanata; Chang-Gang Zhang; Hong Zhao, both of Nepean, all of Canada

[73] Assignee: Northern Telecom Limited, Montreal, Canada

[21] Appl. No.: 588,174

[22] Filed: Jan. 18, 1996

[51] Int. Cl.$^6$ ..................................................... H04Q 7/38
[52] U.S. Cl. ...................... 455/33.2; 455/33.4; 455/56.1; 379/60
[58] Field of Search .......................... 455/33.1, 33.2, 455/33.4, 34.1, 34.2, 53.1, 54.1, 54.2, 56.1, 52, 63, 67.1, 67.3, 67.6; 379/59, 60; 395/900

[56] References Cited

U.S. PATENT DOCUMENTS

| | | | |
|---|---|---|---|
| 5,432,842 | 7/1995 | Kinoshita et al | 455/33.2 |
| 5,596,625 | 1/1997 | LeBlanc | 455/33.2 |

FOREIGN PATENT DOCUMENTS

WO 93/26100  12/1993  WIPO .

OTHER PUBLICATIONS

"A New Hand-Off Algorithm Using Fuzzy Logic", G. Edwards et al., IEEE Proceedings of Southeastcon '94, New York 1994, pp. 89–92.
"Performance Analysis of a New Fuzzy Handoff Algorithm by an Indoor Propagation Simulator", Y.Kinoshita et al., Proc.of 1993 IEEE Vehicular Technology Conference, New York 1993, pp. 241–245.
"Advanced Handoff Control Using Fuzzy Interference for Indoor Radio System", Y.Kinoshita et al., Proc.of 1993 IEEE Vehicular Technology Conference, New York 1993, pp. 649–653.
"An Advanced Air Interface for Integrated Digital Mobile Communications Systems", M.Kitagawa et al., IEEE Global telecommunications Conference, 1991, pp.1474–1479.
Pattern Recognition Techniques in Handoff and Service Area Determination, H.Maturino–Lozoya et al., IEEE 1994, pp.96–100.

*Primary Examiner*—Reinhard J. Eisenzopf
*Assistant Examiner*—Thanh Le
*Attorney, Agent, or Firm*—R. John Haley

[57] ABSTRACT

In a cellular radio communications system, handoff of a mobile terminal from a serving base station to an adjacent base station is performed using two separate fuzzy logic procedures for handoff triggering and handoff targeting. For triggering, inputs to the fuzzy logic procedure are the signal strength for communications with the serving base station, a time since a failure to complete execution of a handoff, and, for mobile-assisted handoff (MAHO), signal strengths of communications between the mobile terminal and each of the adjacent base stations. If handoff is triggered, then handoff targeting is performed at a central unit. For targeting, inputs to the fuzzy logic procedure are the monitored signal strengths between the mobile terminal and each of the adjacent base stations, supplied either from the mobile terminal using MAHO or from the base stations, and the current loads of the adjacent base stations. The targeting determines preferences for handoff of the mobile terminal to the different adjacent base stations, handoff then being executed in accordance with these preferences.

20 Claims, 4 Drawing Sheets

FUZZY LOGIC CONTROL OF CELLULAR HANDOFF

This invention relates to fuzzy logic control of handoff in cellular radio communications systems.

BACKGROUND OF THE INVENTION

The performance of cellular radio communications systems, referred to below simply as cellular systems, is dependent upon efficient handoff of mobile terminals between different base stations as the mobile terminals move, and this becomes more important with reduced cell sizes to facilitate reuse of frequencies. Cellular systems rely primarily on signal strength measurements for triggering handoff, and it is recognized that signal strengths vary due to various factors including topographical changes, building shadows, and multi-path fading, so that the serving areas of the base stations can depart considerably from the intended geographical coverages, and the boundaries between cells become imprecise.

Conventional cellular systems trigger a handoff if a received signal strength indication (RSSI) falls below a threshold level; handoff triggering is followed by screening and targeting of adjacent cells to determine an optimum candidate base station for handoff, and subsequent execution of the handoff to this base station. Imprecise cell boundaries and small cell sizes result in an excessive number of handoff triggers, and hence excessive processing requirements, in such systems. In order to reduce this disadvantage, and to reduce repeated handoffs back and forth of the same mobile terminal between two adjacent base stations (ping-pong effect), a signal strength hysteresis can be incorporated into the handoff triggering process. This involves the disadvantage of delaying handoffs.

It has been proposed to apply fuzzy logic procedures to the handoff of a mobile terminal from one base station to another. These proposals are concerned with only two base stations, and hence only with the use of fuzzy logic handoff triggering.

In addition, the specification of International Patent Application Number PCT/SE93/00547 filed Jun. 18, 1993 and published on Dec. 23, 1993 with the number WO 93/26100, entitled "Methods And Apparatus Pertaining To Handoff In A Mobile Telecommunication System", attempts to describe an arrangement in which a handoff decision can be made based on a fuzzy logic evaluation of at least two communication parameters. However, the description lacks clarity.

These proposals do not provide a sufficient solution for efficient handoff in practical cellular systems.

An object of this invention is to provide an improved method of controlling handoff in a cellular radio communications system.

SUMMARY OF THE INVENTION

One aspect of this invention provides a method of controlling handoff in a cellular radio communications system, comprising the steps of: monitoring parameters for use in determining handoffs; in a handoff triggering step, applying fuzzy logic procedures to at least one monitored parameter to selectively determine a trigger for handoff of a mobile terminal from a serving base station, via which the mobile terminal is communicating, to another base station from among a plurality of adjacent base stations; in a handoff targeting step separate from the handoff triggering step and responsive to the handoff trigger, applying fuzzy logic procedures to at least one monitored parameter to determine preferences for handoff of the mobile terminal to different ones of said plurality of adjacent base stations; and executing handoff of the mobile terminal from the serving base station to one of said plurality of adjacent base stations in accordance with said preferences.

Another aspect of the invention provides a method of controlling handoff of a mobile terminal from a serving base station, via which the mobile terminal is communicating, to another base station from among a plurality of adjacent base stations, in a cellular radio communications system, comprising the steps of: monitoring signal strength of communications between the mobile terminal and the serving base station; in a handoff triggering step, applying fuzzy logic procedures to at least one parameter comprising the monitored signal strength to selectively determine a handoff trigger; monitoring signal strengths of communications between the mobile terminal and each of said plurality of adjacent base stations; monitoring a current load of each of said plurality of adjacent base stations; in a handoff targeting step separate from the handoff triggering step and responsive to the handoff trigger, applying fuzzy logic procedures to parameters including the monitored signal strengths between the mobile terminal and each of said plurality of adjacent base stations and the current load of each of said plurality of adjacent base stations to determine preferences for handoff of the mobile terminal to different ones of said plurality of adjacent base stations; and executing handoff of the mobile terminal from the serving base station to one of said plurality of adjacent base stations in accordance with said preferences.

A further aspect of the invention provides a method of controlling handoff of a mobile terminal from a serving base station, via which the mobile terminal is communicating, to another base station from among a plurality of adjacent base stations, in a cellular radio communications system, comprising the steps of: monitoring signal strength of communications between the mobile terminal and the serving base station; in a handoff triggering step, applying fuzzy logic procedures to at least one parameter comprising the monitored signal strength to selectively determine a handoff trigger; in response to the handoff trigger, monitoring signal strengths of communications between the mobile terminal and each of said plurality of adjacent base stations; monitoring a current load of each of said plurality of adjacent base stations; in a handoff targeting step separate from the handoff triggering step and responsive to the handoff trigger, applying fuzzy logic procedures to parameters including the monitored signal strengths between the mobile terminal and each of said plurality of adjacent base stations and the current load of each of said plurality of adjacent base stations to determine preferences for handoff of the mobile terminal to different ones of said plurality of adjacent base stations; and executing handoff of the mobile terminal from the serving base station to one of said plurality of adjacent base stations in accordance with said preferences.

BRIEF DESCRIPTION OF THE DRAWINGS

The invention will be further understood from the following description with reference to the accompanying drawings, in which.

DETAILED DESCRIPTION

Figure 1:
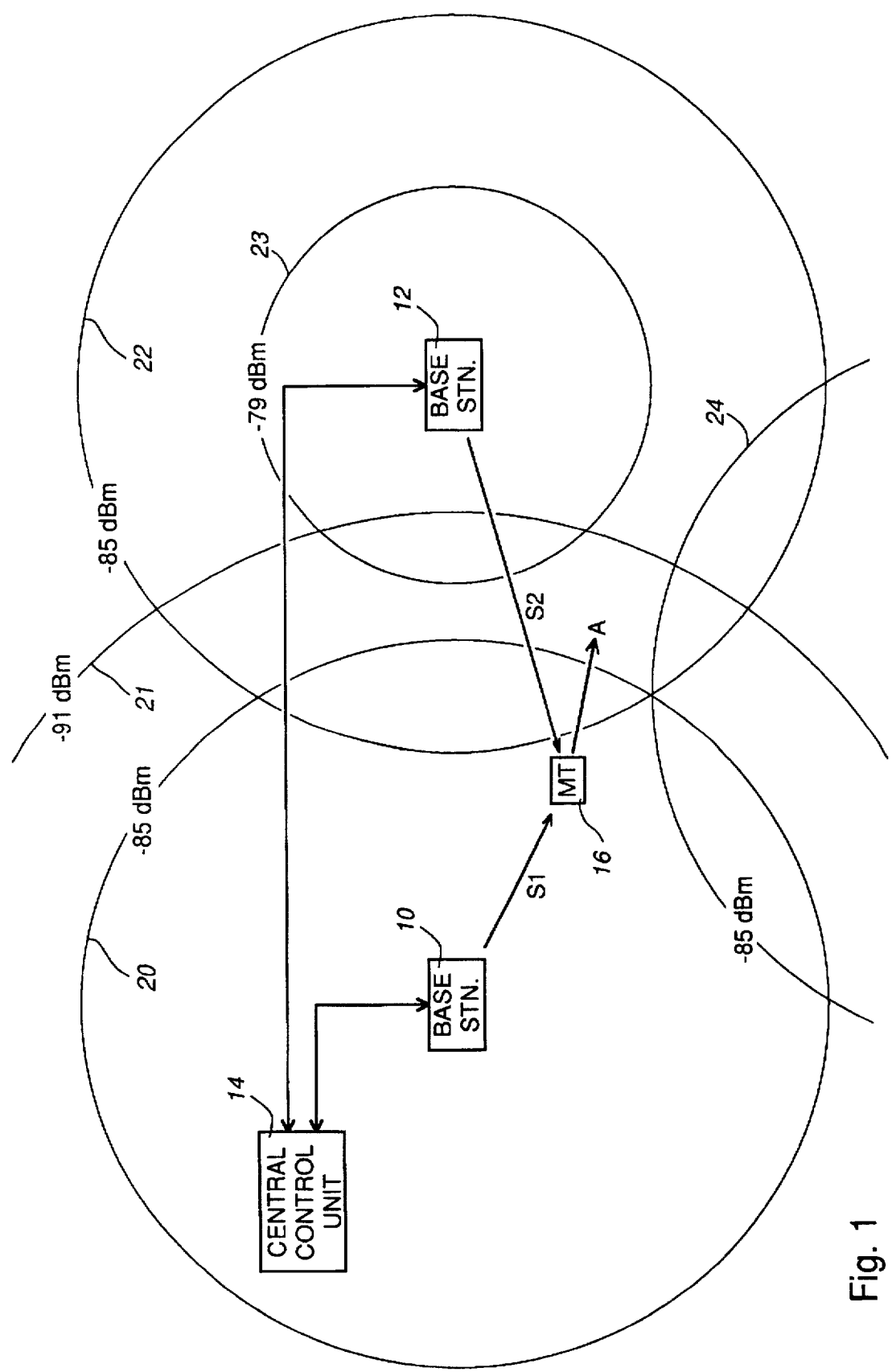
FIG. 1 schematically illustrates aspects of a cellular radio communications system.

Referring to FIG. 1, a cellular radio communications system is illustrated as including two base stations 10 and 12 in adjacent cells, each base station being connected to an arbitrarily-located central control unit 14, and a mobile terminal (MT) 16 which carries out radio communications via the base stations. The central control unit 14 is illustrated and described herein as a single unit for simplicity, but in practice this unit can comprise several different units and functions, for example a mobile telephone exchange, a central controller, and an intelligent cellular peripheral. Thus the components illustrated in FIG. 2 and described herein are merely representative of components in a practical cellular system which would include many cells, base stations, and mobile terminals. For example, the cellular system can be a TDMA (time division multiple access) system using MAHO (mobile-assisted handoff). Such details are well known in the art and need not be described here.

In FIG. 1 it is assumed that the MT 16 is within the coverage area or cell served by the base station 10 and is currently communicating via this base station, which is referred to as the serving base station. The MT 16 monitors the RSSI, designated S1 in FIG. 1, from this base station 10. With movement of the MT 16 in an arbitrary direction, for example represented by an arrow A in FIG. 1, the RSSI S1 monitored by the MT 16 will vary and, in particular, may fall to a level at which a handoff from the base station 10 to another base station is desirable. In accordance with the MAHO feature, the MT 16 also monitors the RSSI from (for example six) other adjacent base stations, such as the RSSI designated S2 from the base station 12. The monitored signal strengths are used in determining handoff triggering in the manner described below.

FIG. 1 also illustrates signal strength contours 20 to 24 which indicate signal strengths from the base stations. These contours are illustrated ideally in FIG. 1 as being circular, but as explained in the introduction the signal strengths are affected by factors such as topography, buildings, and fading and hence in practice the contours may be far from circular. The contours 20 and 21 represent average RSSIs, as monitored by a mobile terminal receiving from the base station 10, of respectively −85 and −91 dBm. The contours 22 and 23 represent average RSSIs, as monitored by a mobile terminal receiving from the base station 12, of respectively −85 and −79 dBm. The contour 24 represents average RSSI, as monitored by a mobile terminal receiving from a base station (not shown) in another adjacent cell, of −85 dBm.

Figure 2:
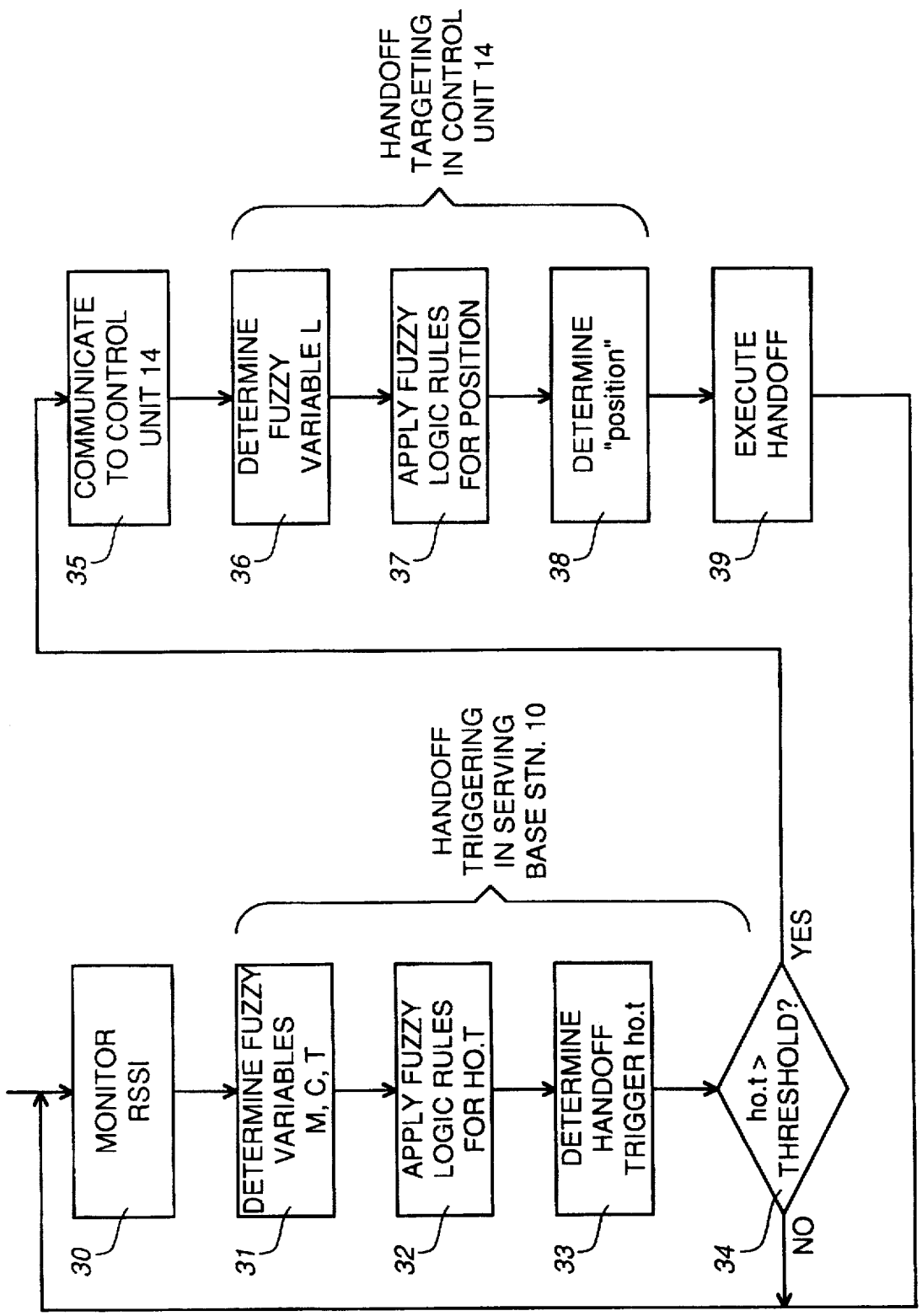
FIG. 2 illustrates a flow chart showing steps associated with cellular handoff in accordance with an embodiment of the invention.

FIG. 2 illustrates a flow chart showing steps associated with handoff for the MT 16 in the cellular system represented in FIG. 1. A first step 30 in FIG. 2 represents the monitoring by the MT 16 of RSSIs from the serving and adjacent base stations in known manner as discussed above. For example, the MT 16 communicates the monitored RSSI for the serving base station 10 and for each of the monitored adjacent base stations such as the base station 12, once per second, to the base station 10, which determines short and long term averages of these measurements.

A fuzzy logic process is carried out in the serving base station 10 in order to determine handoff triggering. As shown in FIG. 2, this process includes sequential steps 31 to 34 of determining fuzzy variables M, C, and T, applying a set of fuzzy logic rules for a handoff trigger fuzzy variable HO.T, determining a precise value of a handoff trigger variable ho.t, and comparing this value with a threshold. The result of this comparison determines whether or not a handoff is triggered for the MT 16. The fuzzy variable C relates to a specific adjacent base station, of which in this case six are monitored and the measurements of the best four are used in determining handoff triggering and targeting. Consequently, the steps 31 to 34 are performed for each fuzzy variable C for the respective base stations, the fuzzy variables M and T being the same in each case. Consequently four handoff trigger variables ho.t are produced, one for each adjacent base station, and in the comparison step 34 a handoff is triggered if at least one of these four variables ho.t exceeds the threshold. For simplicity and convenience, FIG. 2 only shows the steps 31 to 34 in relation to one adjacent base station, and these steps are described in detail below, with additional reference to FIGS. 3 to 6, also in respect of only one adjacent base station (i.e. only one of the four fuzzy variables C). However, it can be seen that the same determinations apply equally to the other adjacent base stations to produce the respective variables ho.t and the respective comparisons with the threshold.

Figure 3:
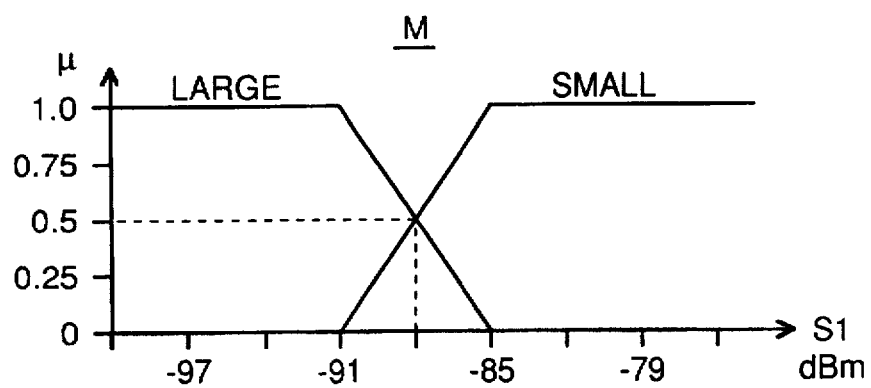
FIGS. 3 to 8 illustrate membership functions for fuzzy logic control of handoff in accordance with the flow chart of FIG. 2.
Figure 4:
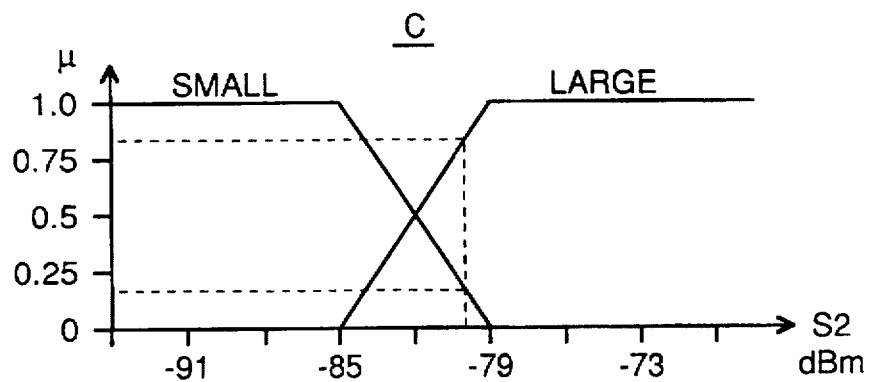
Figure 5:
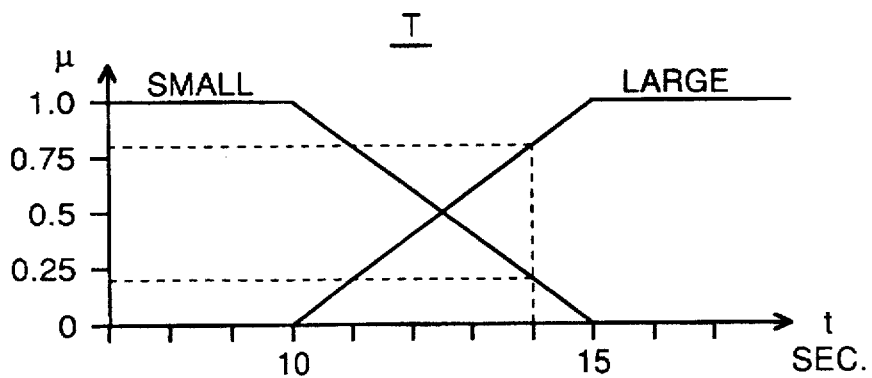

As shown in FIGS. 3 to 5, each of the fuzzy logic variables M, C, and T has fuzzy sets SMALL and LARGE with a membership function $\mu$ for each set dependent upon a monitored parameter in the manner represented in these figures. The value of $\mu$ is in each case in the range from 0 to 1.

For the fuzzy logic variable M the parameter is the RSSI S1 from the serving base station 10. The membership functions $\mu$ in the sets LARGE and SMALL for this variable are represented graphically in FIG. 3. As can be seen from this figure, for a signal strength S1 which is greater than −85 dBm (within the contour 20 in FIG. 1) the membership function $\mu_{SMALL}$ is 1 and the membership function $\mu_{LARGE}$ is 0. For a signal strength S1 which is less than −91 dBm (outside the contour 21 in FIG. 1) the membership function $\mu_{SMALL}$ is 0 and the membership function $\mu_{LARGE}$ is 1. For a signal strength S1 which is between −85 and −91 dBm (between the contours 20 and 21 in FIG. 1) the membership functions $\mu_{SMALL}$ and $\mu_{LARGE}$ are between 0 and 1. The lines in FIG. 3 illustrate a linear change for each membership function within this range, but the changes could be non-linear and need not be reciprocal as shown in FIG. 3 (i.e. the sum of the membership functions $\mu_{SMALL}$ and $\mu_{LARGE}$ need not be one).

For the fuzzy logic variable C the parameter is the RSSI S2 from the respective adjacent base station, for example the adjacent base station 12. The membership functions $\mu$ in the sets SMALL and LARGE for this variable are represented graphically in FIG. 4. As can be seen from this figure, for a signal strength S2 which is less than −85 dBm (outside the contour 22 in FIG. 1) the membership function $\mu_{SMALL}$ is 1 and the membership function $\mu_{LARGE}$ is 0. For a signal strength S2 which is greater than −79 dBm (within the contour 23 in FIG. 1) the membership function $\mu_{SMALL}$ is 0 and the membership function $\mu_{LARGE}$ is 1. For a signal strength S2 which is between −85 and −79 dBm (between the contours 22 and 23 in FIG. 1) the membership functions $\mu_{SMALL}$ and $\mu_{LARGE}$ are between 0 and 1. The lines in FIG. 4 illustrate a linear change for each membership function within this range, but the changes could be non-linear and need not be reciprocal as shown in FIG. 4 (i.e. the sum of the membership functions $\mu_{SMALL}$ and $\mu_{LARGE}$ need not be one).

As described above, the fuzzy range of the fuzzy logic variables M and C is 6 dB in each case, from −85 to −91 dBm for the variable M and from −79 to −85 dBm for the variable C. This range need not necessarily be the same for the two variables. However, it can be desirable for this fuzzy range to match at least approximately the shadowing variance in the system. In the event that field measurements of shadowing variance are available, these can be used to determine approximately the fuzzy range for the fuzzy logic variables M and C.

For the fuzzy logic variable T the parameter is the time t in seconds since the last failed handoff (i.e. execution of the handoff was not completed) for the MT 16. The use of this parameter t serves to reduce repeated rapid triggering of a handoff for the MT in the event that the handoff can not be completed. The membership functions μ in the sets SMALL and LARGE for this variable are represented graphically in FIG. 5. As can be seen from this figure, for a time t of up to 10 seconds the membership function $\mu_{SMALL}$ is 1 and the membership function $\mu_{LARGE}$ is 0. For a time t of 15 seconds or more the membership function $\mu_{SMALL}$ is 0 and the membership function $\mu_{LARGE}$ is 1. For a time t between 10 and 15 seconds the membership functions $\mu_{SMALL}$ and $\mu_{LARGE}$ are between 0 and 1. The lines in FIG. 5 illustrate a linear change for each membership function within this range, but the changes could be non-linear and need not be reciprocal as shown in FIG. 5 (i.e. the sum of the membership functions $\mu_{SMALL}$ and $\mu_{LARGE}$ need not be one).

The membership functions can also be represented mathematically. For example, for the variable T the linear relationship illustrated in FIG. 5 can be represented by the following equations:

$$\mu_{SMALL}(t) = \begin{cases} 1 & t \leq 10 \\ (15-t)/5 & 10 < t < 15 \\ 0 & t \geq 15 \end{cases}$$

$$\mu_{LARGE}(t) = \begin{cases} 0 & t \leq 10 \\ (t-10)/5 & 10 < t < 15 \\ 1 & t \geq 15 \end{cases}$$

Figure 6:
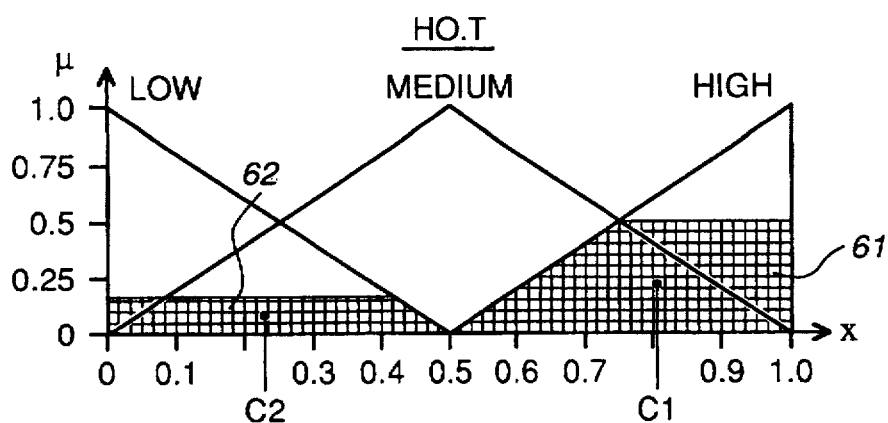

Thus in the step 31 of FIG. 2 the membership functions $\mu_{SMALL}$ and $\mu_{LARGE}$ for each of the fuzzy variables M, C, and T are determined from the parameters S1, S2, and the time t since the last failed handoff for the mobile terminal, respectively. In the next step 32 of FIG. 2, fuzzy logic rules or inferences are applied in order to determine membership values for sets of a fuzzy variable HO.T (handoff trigger). In this embodiment of the invention, the fuzzy variable HO.T has three sets LOW, MEDIUM, and HIGH whose membership functions are represented in FIG. 6, in a similar manner to FIGS. 3 to 5, in relation to a variable x having values from 0 to 1. There are three fuzzy logic variables M, C, and T each with two sets, for which there are $2^3=8$ rules R1 to R8 as follows:

R1: If (T is LARGE) and (M is LARGE) and (C is LARGE) then HO.T is HIGH.
R2: If (T is SMALL) and (M is SMALL) and (C is SMALL) then HO.T is LOW.
R3: If (T is SMALL) and (M is LARGE) and (C is LARGE) then HO.T is MEDIUM.
R4: If (T is SMALL) and (M is SMALL) and (C is LARGE) then HO.T is MEDIUM.
R5: If (T is SMALL) and (M is LARGE) and (C is SMALL) then HO.T is MEDIUM.
R6: If (T is LARGE) and (M is LARGE) and (C is SMALL) then HO.T is MEDIUM.
R7: If (T is LARGE) and (M is SMALL) and (C is SMALL) then HO.T is MEDIUM.
R8: If (T is LARGE) and (M is LARGE) and (C is SMALL) then HO.T is MEDIUM.

As is known in accordance with fuzzy logic processes, the "and" in these rules means the minimum membership value. Thus for example the rule R1 is understood to mean that the HO.T membership value $\mu_{HIGH}$ is equal to the minimum of the membership value $\mu_{LARGE}$ for the variable T, the membership value $\mu_{LARGE}$ for the variable M, and the membership value $\mu_{LARGE}$ for the variable C. The other rules R2 to R8 can be similarly understood. All of the rules R1 to R8 are applied, to result in 8 membership values for the sets LOW, MEDIUM, and HIGH of the fuzzy variable HO.T.

For each of the rules R1 to R8, the value of x is determined for the centroid of an area defined by the membership function for the respective set, clipped by the membership value determined as described above for the respective rule. The 8 rules R1 to R8 thus result in the determination of x-values of 8 centroids; the centroids and their x-values are referred to as C1 to C8 respectively below.

In the subsequent step 33 in FIG. 2, a precise (de-fuzzy) value of a handoff trigger ho.t is determined as being equal to the weighted average of the centroids C1 to C8. Thus denoting the membership values determined in applying the rules R1 to R8 as μ1 to μ8 respectively, then the handoff trigger ho.t is determined from the equation:

$$ho.t = \frac{\sum_{i=1}^{8} Ci\,\mu i}{\sum_{i=1}^{8} \mu i}$$

This gives a precise value of the variable ho.t in a range from 0 to 1. In the further step 34 in FIG. 2, this variable ho.t is compared with a handoff trigger threshold, which can for example conveniently be a fixed value such as 0.5, to determine whether or not a handoff is triggered for the MT 16. If the threshold is exceeded (for at least one of the four adjacent base station fuzzy variables C), then the next step 35 in FIG. 2 is reached, and otherwise a return is made to the step 30 in FIG. 2.

The above steps are further explained below by a specific illustration. For example, suppose that the step 30 results in the parameters S1=−88 dBm for the serving base station 10 and S2=−80 dBm for the candidate base station 12 currently being considered, and that t=14 seconds have elapsed since a failed handoff attempt for the MT 16. As shown by broken lines in FIGS. 3 to 5, these result in membership values for the fuzzy variables M, C, and T as follows:

| T | $\mu_{SMALL}=0.2$ | $\mu_{LARGE}=0.8$ |
|---|---|---|
| M | $\mu_{SMALL}=0.5$ | $\mu_{LARGE}=0.5$ |
| C | $\mu_{SMALL}=0.17$ | $\mu_{LARGE}=0.83$ |

Applying rule R1 above gives a membership value for the HIGH set of the fuzzy variable HO.T which is the minimum of the $\mu_{HIGH}$ values for the fuzzy variables M, C, and T. Thus rule R1 gives a membership value of $\mu_{HIGH}$=MIN(0.8, 0.5, 0.83)=0.5. Similarly, the other rules give membership values for HO.T of:

R2: $\mu_{LOW}$=MIN(0.2, 0.5, 0.17)=0.17
R3: $\mu_{MEDIUM}$=MIN(0.2, 0.5, 0.83)=0.2
R4: $\mu_{MEDIUM}$=MIN(0.2, 0.5, 0.83)=0.2
R5: $\mu_{MEDIUM}$=MIN(0.2, 0.5, 0.17)=0.17
R6: $\mu_{MEDIUM}$=MIN(0.8, 0.5, 0.83)=0.5
R7: $\mu_{MEDIUM}$=MIN(0.8, 0.5, 0.17)=0.17
R8: $\mu_{MEDIUM}$=MIN(0.8, 0.5, 0.17)=0.17

Referring to FIG. 6, a checkered area 61 illustrates the area defined by the membership function for the set HIGH, which has the equation $\mu_{HIGH}=2x-1$, clipped at $x \geq 0.75$ by the membership value of $\mu 1=0.5$ determined as described above for the rule R1. The centroid C1 for this area 61 is given by the equation:

$$C1 = \frac{\int_{0.5}^{0.75}(2x-1) \times dx + \int_{0.75}^{1} 0.5 \times dx}{\int_{0.5}^{0.75}(2x-1)dx + \int_{0.75}^{1} 0.5 dx} = 0.805552$$

In addition, a checkered area 62 in FIG. 6 illustrates the area defined by the membership function for the set LOW, which has the equation $\mu_{LOW}=1-2x$, clipped at $x \leq 0.415$ by the membership value of $\mu 2=0.17$ determined as described above for the rule R2. The centroid C2 for this area 62 is given by the equation:

$$C2 = \frac{\int_{0}^{0.415} 0.17 \times dx + \int_{0.415}^{0.5}(1-2x) \times dx}{\int_{0}^{0.415} 0.17 dx + \int_{0.415}^{0.5}(1-2x)dx} = 0.22933$$

As can be seen from FIG. 6, the membership function for the set MEDIUM of the fuzzy variable HO.T is symmetrical about $x=0.5$, being defined by:

$$\mu_{MEDIUM} = \begin{cases} 2x & x \leq 0.5 \\ 2(1-x) & 0.5 < x \leq 1 \end{cases}$$

As a result of this symmetry, the membership value $\mu_{MEDIUM}$ does not affect the x-value of the centroids and each of the centroids C3 to C8 has an x-value of 0.5.

The precise value of the handoff trigger ho.t is then determined from the weighted average of the centroids C1 to C8, thus ho.t=

$$\frac{(0.805552 \times 0.5) + (0.22933 \times 0.17) + 0.5((2 \times 0.2) + (3 \times 0.17) + 0.5)}{(0.805552 + 0.22933 + (2 \times 0.2) + (3 \times 0.17) + 0.5)} = 0.609898$$

As this value exceeds the threshold of 0.5, handoff is triggered.

As shown by a step 35 in FIG. 2, in response to handoff triggering the serving base station 10 communicates to the central control unit 14 data indicating a need for handoff of the MT 16 to an adjacent base station, this data including the RSSI fuzzy variable C for each of the four adjacent base stations being monitored by the MT 16. The unit 14 performs handoff targeting, in which it determines an order of preference of the adjacent base stations for handoff of the MT 16, also using fuzzy logic processing as further described below. It is observed that the serving base station 10 does not communicate to the central control unit 14 any information as to which of the four adjacent base stations contributed to the handoff triggering, but only that handoff has been triggered.

As shown in FIG. 2, the handoff targeting process includes sequential steps 36 to 38 of respectively determining a fuzzy variable L for each of the four adjacent base stations, applying a set of fuzzy logic rules in each case for a handoff target fuzzy variable POSITION, and determining a precise value of a handoff target variable "position" for each adjacent base station. The variable "position" indicates the order of preference of the adjacent base stations for handoff. These steps are described in detail below with additional reference to FIGS. 7 and 8.

Figure 7:
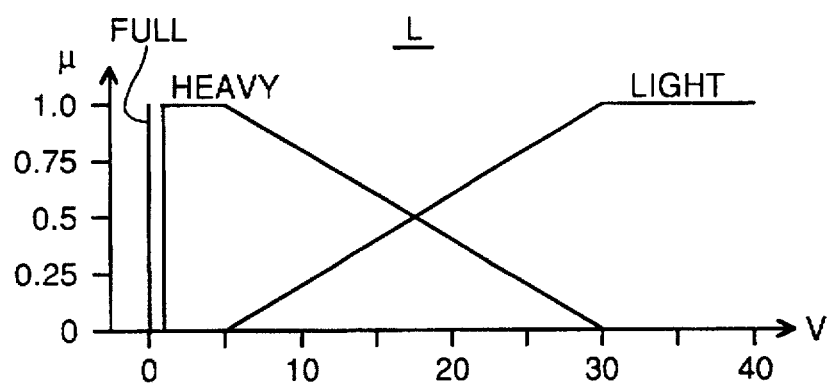

As shown in FIG. 7, the fuzzy logic variable L has fuzzy sets FULL, HEAVY, and LIGHT with a membership function $\mu$, in the range from 0 to 1, dependent upon the number V of voice channels available for communications via the respective adjacent base station. This loading information for the base stations is already present in the control unit 14. As is shown graphically in FIG. 7, if the respective base station is already fully loaded, and hence V=0, then the membership function $\mu_{FULL}=1$; otherwise $\mu_{FULL}=0$. The membership function $\mu_{HEAVY}=1$ for values of V from 1 to 5, $\mu_{HEAVY}=(30-V)/25$ for values of V from 5 to 30, and otherwise $\mu_{HEAVY}=0$. The membership function $\mu_{LIGHT}=0$ for $V \leq 5$, $\mu_{LIGHT}=(V-5)/25$ for $5 \leq V \leq 30$, and $\mu_{LIGHT}=1$ for $V \geq 30$. As in the case of FIGS. 3 to 5, the linear changes for the membership functions in the range $5 \leq V \leq 30$ in FIG. 7 could instead be non-linear and the membership functions need not be reciprocal (i.e. the sum of $\mu_{FULL}$, $\mu_{HEAVY}$, and $\mu_{LIGHT}$ need not be 1).

Figure 8:
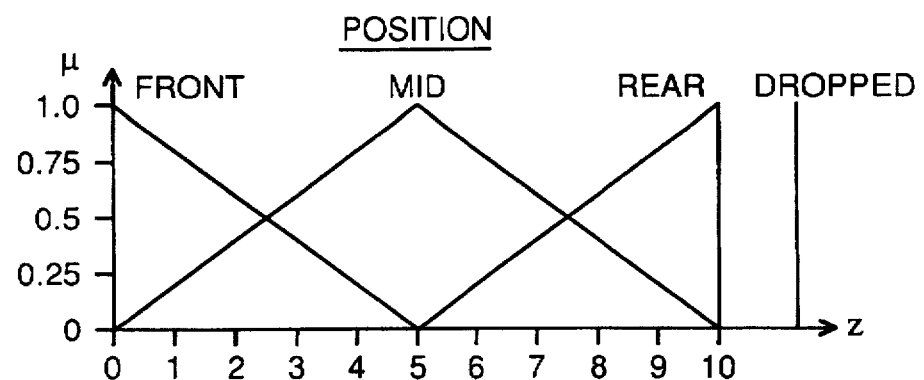

Thus in the step 36 of FIG. 2 the membership functions for the fuzzy variable L are determined by the control unit 14 from the parameter V for each of the four adjacent base stations. In the next step 37 of FIG. 2, the control unit 14 applies fuzzy logic rules in order to determine, for each adjacent base station, membership values for sets of the fuzzy variable POSITION, which as shown in FIG. 8 has four sets FRONT, MID, REAR, and DROPPED. In this step 37, for each adjacent base station the control unit 14 first applies a rule R11 dependent only on the fuzzy variable L for the respective base station, and subsequently (if $V \geq 1$ for the base station) applies rules R12 to R15 with respect to the fuzzy variables L and C for the respective base station, the latter having been communicated to the control unit 14 from the serving base station 10 in step 35 of FIG. 2 as described above. The fuzzy logic rules R11 to R15 are as follows:

R11: If (L is FULL) then POSITION is DROPPED.
R12: If (C is LARGE) and (L is LIGHT) then POSITION is FRONT.
R13: If (C is SMALL) and (L is HEAVY) then POSITION is REAR.
R14: If (C is LARGE) and (L is HEAVY) then POSITION is MID.
R15: If (C is SMALL) and (L is LIGHT) then POSITION is MID.

As described above, the "and" in these rules means the minimum membership value. Thus for example the rule R12 is understood to mean that the POSITION membership value $\mu_{FRONT}$ is equal to the minimum of the membership value $\mu_{LARGE}$ for the variable C and the membership value $\mu_{LIGHT}$ for the variable L. Assuming that the rule R11 is not satisfied, then all of the other rules R12 to R15 are applied for each adjacent base station, to result in 4 membership values for the sets FRONT, MID, and REAR of the fuzzy variable POSITION.

In a similar manner to that described above for the rules R1 to R8, the value of a parameter z shown in FIG. 8 is determined for the centroid of an area defined by the membership function for the respective set, clipped by the membership value determined as described above for the respective rule. For each adjacent base station, the 4 rules R12 to R15 thus result in the determination of z-values of 4 centroids. In a similar manner to that described above for the step 33 in FIG. 2, in the step 38 a precise value of the variable "position" is determined as being equal to the weighted average of these centroids.

In a subsequent step 39 in FIG. 2, the control unit 14 executes a handoff of the MT 16 in known manner, in accordance with the variable "position". To this end, as is known in the art, the control unit 14 selects as a target base station for the handoff the adjacent base station which has the most desirable (lowest) value of the variable "position", and allocates for the MT 16 an unused time slot among the active channels for that base station, or time slot of a new channel if there are no unused time slots. If no new channel is available, then the control unit 14 proceeds in the same manner with respect to the next best adjacent base station, i.e. that with the next lowest value of the variable "position", and so on until the handoff is executed or all of the four adjacent base stations have been tried. In the latter case the handoff fails and a timer for the time t discussed above is reset in the base station 10 which remains the serving base station. Whether the handoff is executed or not, a return is made to the monitoring in step 30 of FIG. 2.

It can be seen from the above description that the handoff targeting steps 36 to 38 in FIG. 2, performed by the central control unit 14, take into account the load distribution among the various base stations as well as the strengths of their signals as monitored by the MT 16. The application of fuzzy logic processes to the handoff targeting in the central control unit 14, separately from the use of fuzzy logic processes in the serving base station 10 to determine handoff triggering, produces a desirable result in which the disadvantages of known systems as discussed in the introduction are reduced or avoided. In particular, there is a reduction in handoff triggering, and a consequent reduction in handoff targeting, a reduction in unsuccessful handoff execution, and a reduction in directed handoffs, all of which contribute to considerably reduced processing requirements and more efficient system operation.

It can be appreciated from the above description that the two fuzzy logic processes, respectively in the serving base station for handoff triggering and in the central control unit 14 for handoff targeting, are completely separate processes even though the fuzzy logic variable C for each adjacent base station is used in both processes. Thus the fuzzy logic process for handoff triggering carried out in the serving base station 10 merely determines whether or not handoff is desired, and the fuzzy logic process for handoff targeting carried out in the central control unit 14 separately determines a preference order of the adjacent base stations for executing the handoff.

Although the above description relates specifically to a TDMA system using MAHO, the invention is also applicable to other cellular systems. For example, in a TDMA system which does not use MAHO, the fuzzy variable M is determined in the serving base station 10 in dependence upon the upstream RSSI, i.e. the signal strength received at that base station from the MT 16, instead of being dependent upon the downstream signal strength parameter S1 as described above. The determination of the fuzzy variable can be substantially the same as that described above. In addition, in this case the MT 16 does not produce the parameter S2 for each adjacent base station, so that the fuzzy variable C is not determined and handoff triggering is performed in a simplified manner using only the fuzzy variables M and T. For handoff targeting in this case, in response to handoff triggering being communicated to the central control unit 14, this unit 14 in known manner sends a Locate Request message to each of the adjacent, candidate, base stations such as the base station 12. Each such base station measures the upstream signal strength from the MT 16 and supplies this measurement to the central control unit 14, the measurement being converted into the respective fuzzy variable C, as described above with respect to FIG. 4, either in the respective base station or in the central control unit 14. Handoff targeting is then completed in the same manner as described above in dependence upon the fuzzy variables C and L.

In the case of an AMPS system, the handoff triggering and targeting procedures are substantially the same as for a TDMA system which does not use MAHO, typically with only three adjacent base stations as candidates for the handoff.

In the case of a system using sectored cells, then parameters for the serving and adjacent sectors are used in a similar manner instead of the parameters as described above for the serving and adjacent base stations.

In addition, although the invention has been described above in relation to specific fuzzy logic rules and membership functions, it can be appreciated that these can be varied and supplemented to suit particular requirements, and the invention is not limited to these details. Although in the above description handoff triggering takes place in the serving base station, it could alternatively be carried out in the mobile terminal itself. Accordingly it can be appreciated that these and other numerous changes, variations, and adaptations may be made to the particular embodiments of the invention described above without departing from the scope of the invention as defined in the claims.

What is claimed is:

1. A method of controlling handoff in a cellular radio communications system, comprising the steps of:
   monitoring parameters for use in determining handoffs;
   in a handoff triggering step, applying fuzzy logic procedures to at least one monitored parameter to selectively determine a trigger for handoff of a mobile terminal from a serving base station, via which the mobile terminal is communicating, to another base station from among a plurality of adjacent base stations;
   in a handoff targeting step separate from the handoff triggering step and responsive to the handoff trigger, applying fuzzy logic procedures to at least one monitored parameter to determine preferences for handoff of the mobile terminal to different ones of said plurality of adjacent base stations; and
   executing handoff of the mobile terminal from the serving base station to one of said plurality of adjacent base stations in accordance with said preferences.

2. A method as claimed in claim 1 wherein the handoff triggering step is performed at the serving base station and the handoff targeting step is performed at a central unit common to a plurality of base stations, the method further including the step of communicating the handoff trigger from the serving base station to the central unit.

3. A method as claimed in claim 2 wherein the monitored parameters include a received signal strength monitored at the mobile terminal for each of said plurality of adjacent base stations, the method further including the steps of communicating the monitored received signal strengths from the mobile terminal to the serving base station and, in the event of a handoff trigger, communicating the monitored signal strengths from the base station to the central unit, wherein the communicated received signal strengths are used as parameters for the fuzzy logic procedures in the handoff targeting step.

4. A method as claimed in claim 3 wherein a current load of each of said plurality of adjacent base stations is also used as a parameter for the fuzzy logic procedures in the handoff targeting step.

5. A method as claimed in claim 3 wherein the monitored received signal strengths, communicated from the mobile terminal to the serving base station, and a monitored signal strength of communications between the mobile terminal and the serving base station, are used as parameters for the fuzzy logic procedures in the handoff triggering step.

6. A method as claimed in claim 4 wherein the monitored parameters further include a time since a failure to complete execution of a handoff of the mobile terminal, and the time is also used as a parameter for the fuzzy logic procedures in the handoff triggering step.

7. A method as claimed in claim 1 wherein the monitored parameters include a time since a failure to complete execution of a handoff of the mobile terminal, and the time is used as a parameter for the fuzzy logic procedures in the handoff triggering step.

8. A method as claimed in claim 7 wherein the monitored parameters further include a signal strength of communications between the mobile terminal and the serving base station, and the monitored signal strength is also used as a parameter for the fuzzy logic procedures in the handoff triggering step.

9. A method as claimed in claim 7 wherein the step of monitoring parameters comprises monitoring, in response to a handoff trigger being determined in the handoff triggering step, a signal strength of communications between the mobile terminal and each of said plurality of adjacent base stations, wherein the monitored signal strengths are used as parameters for the fuzzy logic procedures in the handoff targeting step.

10. A method as claimed in claim 9 wherein a current load of each of said plurality of adjacent base stations is also used as a parameter for the fuzzy logic procedures in the handoff targeting step.

11. A method as claimed in claim 1 wherein the step of monitoring parameters comprises monitoring, in response to a handoff trigger being determined in the handoff triggering step, a signal strength of communications between the mobile terminal and each of said plurality of adjacent base stations, wherein the monitored signal strengths are used as parameters for the fuzzy logic procedures in the handoff targeting step.

12. A method as claimed in claim 9 wherein a current load of each of said plurality of adjacent base stations is also used as a parameter for the fuzzy logic procedures in the handoff targeting step.

13. A method of controlling handoff of a mobile terminal from a serving base station, via which the mobile terminal is communicating, to another base station from among a plurality of adjacent base stations, in a cellular radio communications system, comprising the steps of:

monitoring signal strength of communications between the mobile terminal and the serving base station;

in a handoff triggering step, applying fuzzy logic procedures to at least one parameter comprising the monitored signal strength to selectively determine a handoff trigger;

monitoring signal strengths of communications between the mobile terminal and each of said plurality of adjacent base stations;

monitoring a current load of each of said plurality of adjacent base stations;

in a handoff targeting step separate from the handoff triggering step and responsive to the handoff trigger, applying fuzzy logic procedures to parameters including the monitored signal strengths between the mobile terminal and each of said plurality of adjacent base stations and the current load of each of said plurality of adjacent base stations to determine preferences for handoff of the mobile terminal to different ones of said plurality of adjacent base stations; and executing handoff of the mobile terminal from the serving base station to one of said plurality of adjacent base stations in accordance with said preferences.

14. A method as claimed in claim 13 wherein the steps of monitoring signal strengths comprise monitoring signal strengths received by the mobile terminal from the serving base station and each of the plurality of adjacent base stations.

15. A method as claimed in claim 14 wherein parameters to which the fuzzy logic procedures in the handoff triggering step are applied include the monitored signal strengths of communications between the mobile terminal and each of said plurality of adjacent base stations.

16. A method as claimed in claim 15 and further including the step of monitoring a time since a failure to complete execution of a handoff of the mobile terminal, wherein parameters to which the fuzzy logic procedures in the handoff triggering step are applied include said time.

17. A method as claimed in claim 15 wherein the handoff triggering step is performed at the serving base station or the mobile terminal and the handoff targeting step is performed at a central unit common to a plurality of base stations, the method further including the step of communicating the handoff trigger and the monitored signal strengths of communications between the mobile terminal and each of said plurality of adjacent base stations to the central unit.

18. A method as claimed in claim 13 and further including the step of monitoring a time since a failure to complete execution of a handoff of the mobile terminal, wherein parameters to which the fuzzy logic procedures in the handoff triggering step are applied include said time.

19. A method of controlling handoff of a mobile terminal from a serving base station, via which the mobile terminal is communicating, to another base station from among a plurality of adjacent base stations, in a cellular radio communications system, comprising the steps of:

monitoring signal strength of communications between the mobile terminal and the serving base station;

in a handoff triggering step, applying fuzzy logic procedures to at least one parameter comprising the monitored signal strength to selectively determine a handoff trigger;

in response to the handoff trigger, monitoring signal strengths of communications between the mobile terminal and each of said plurality of adjacent base stations;

monitoring a current load of each of said plurality of adjacent base stations;

in a handoff targeting step separate from the handoff triggering step and responsive to the handoff trigger, applying fuzzy logic procedures to parameters including the monitored signal strengths between the mobile terminal and each of said plurality of adjacent base stations and the current load of each of said plurality of adjacent base stations to determine preferences for handoff of the mobile terminal to different ones of said plurality of adjacent base stations; and executing handoff of the mobile terminal from the serving base station to one of said plurality of adjacent base stations in accordance with said preferences.

20. A method as claimed in claim 19 and further including the step of monitoring a time since a failure to complete execution of a handoff of the mobile terminal, wherein parameters to which the fuzzy logic procedures in the handoff triggering step are applied include said time.

* * * * *